Oct. 17, 1967  F. SPANDÖCK  3,348,195
DEVICE FOR INDICATING MOTIONAL DIRECTION
OF A RADIATOR IN SPACE
Filed Nov. 12, 1954  6 Sheets-Sheet 2

Oct. 17, 1967  F. SPANDÖCK  3,348,195
DEVICE FOR INDICATING MOTIONAL DIRECTION
OF A RADIATOR IN SPACE
Filed Nov. 12, 1954                                    6 Sheets-Sheet 5

United States Patent Office 3,348,195
Patented Oct. 17, 1967

3,348,195
DEVICE FOR INDICATING MOTIONAL DIRECTION OF A RADIATOR IN SPACE
Friedrich Spandöck, Karlsruhe, Germany, assignor to Siemens Aktiengesellschaft, Munich and Berlin, Germany, a corporation of Germany
Filed Nov. 12, 1954, Ser. No. 468,430
Claims priority, application Germany, Nov. 12, 1953, S 36,295
20 Claims. (Cl. 340—16)

This invention relates to a receiving device for determining the direction of motion of a sound radiating object when crossing a plane in space, for example an air corridor, comprising means for effecting the release of a signal only when the sound radiating object or body passes through the plane in a certain direction, while no signal is released when the plane is passed in the opposite direction. The sound radiating body will be briefly referred to as "radiator." Another object of the invention is, to prevent interference, originating from other radiators, from effecting the receiving device.

Acoustic and wireless direction finders are known which would permit discovery of the position of a radiator with reference to a plane in space and also determination of the direction of motion of the radiator when passing this plane. Generally speaking, the known devices effect periodic sweeping or scanning of beams, and synchronously therewith operative switching of an indicating instrument showing the intensities of the received signals. Such devices, however, cannot be used in all circumstances and are not universally applicable. In addition, they require considerable expenditure and, owing to the continuous switching over, mechanically or electrically, they are not always reliable in operation. Furthermore, the intensities received, which must be in a predetermined ratio depending upon the directional characteristics, may be falsified upon passage of the radiator obliquely to the plane. In addition, propagation conditions (wind and weather) may produce an erroneous ratio of intensity. Moreover, the procedure based on the intensities, makes it difficult to produce in the two receivers an omnidirectional scanning effect so as to obtain identical intensity sequence responsive to oblique as well as direct passage.

The apparatus according to the invention avoids these drawbacks because it responds only to phase but not to intensity. If desired, an electrical amplitude limiting may be provided in order to produce an indication which is independent of the distance or, rather to say, only depending on a spatial angle.

The receiving device according to the invention, for determining the direction of motion of a radiator when passing a plane in space achieves a technical advance primarily by the provision of two receivers, especially of groups of directional receivers, arranged at either side of the plane that is to be controlled and at a small distance of approximately half a wave length of the medium frequency received. Their output voltages, if desired after phase shifting by about 90° are conducted to a phase comparison circuit, for example, to a summation and differential rectifier circuit connected with a polarizing device, for example, a polarized relay which is responsive to the vectorial sum of the voltage of the receiver or receiver groups and preferably responsive to the rectified difference voltage of the receiver or receiver groups. The energizing direction of the polarized relay corresponds to the direction in which the radiator passes the plane, actuation of the relay effecting the desired signaling.

In order to assure phasewise correct preference of the direct sound and to eliminate remaining interferences, the receiver or groups of receivers preferably have a directional characteristic which is sharply focused, for example, club-shaped in the one sectional plane, and is wide, for example, kidney-shaped in the other plane which is perpendicular thereto. In accordance with the invention, the receivers or groups of receivers are arranged at either side of the transit plane in such manner, that the sectional planes with the wide, directional characteristic are situated parallel to the transit plane at either side thereof. The groups of receivers are represented by staggered linear groups of radiators comprising a plurality of receivers, for example, microphones disposed in series and connected in phase. Both groups of receivers are preferably arranged in a straight row and are spatially staggered. The straight line of receivers extends transverse to the transit plane. The receivers may be acoustically tuned to the desired frequency range, thus increasing their sensitivity.

In accordance with the invention, the polarized relay serving as receiving device is, for the purpose of signaling, connected with a main relay. Means are provided to prevent the main relay from being energized responsive to first switching over of the polarized relay; the main relay being energized only after the polarized relay has switched over its armature to the right as well as to the left. Interference signals, temporarily occurring on the one side of the plane, are in this manner ineffective to produce a signal. The operatively effective signaling according to the invention requires successive occurrence of the radiation first on one and then on the other side of the plane, that is, passage of a radiator through the plane within a predetermined time interval. The arrangement is preferably such that signalling is effected only upon passage of a radiator in the one direction of motion while preventing signaling responsive to passage in the other direction.

The means for preventing operatively effective signaling responsive to single actuation of the polarized relay may comprise a capacitor connected over a charging-discharging circuit with the polarized and the main relay. The capacitor will be charged when the polarized relay is actuated to the one side and will be discharged over the winding of the main relay responsive to successive actuation thereof to the other side, thereby energizing the main relay. The time constant of the charging and discharging circuit is thereby dimensioned in accordance with the directional characteristic of the receiver or groups of receivers under consideration of the possible rate of motion of the radiator upon passage through the plane.

In some special circumstances, charging and discharging time constants of the capacitor lying within the range of 0.1 to 10 seconds have been found suitable.

The invention will now be described with reference to the accompanying drawings, in which.

Figure 1:
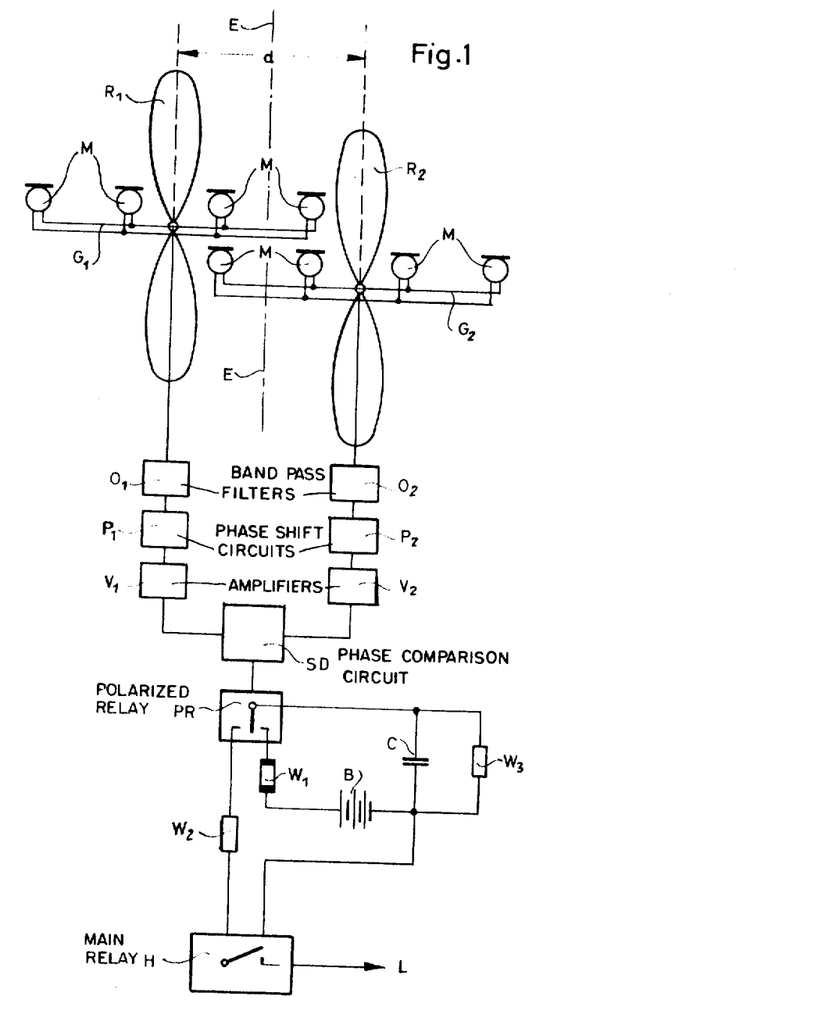
FIG. 1 is a basic diagram of a receiving device according to the invention.

Referring now to FIG. 1, plane E is an assumed area or corridor which may be passed by sound radiating bodies or radiators, especially acoustic radiators. The object of the receiving device in accordance with the invention is to determine the direction of motion of a radiator passing through the corridor E, and thereby releasing a signal under certain conditions. The receiving device comprises groups of receivers $G_1$ and $G_2$ spaced by a predetermined distance $d$ and lying with their centers at either side of the transit plane. The distance $d$ is approximately equal to half a wave length of the frequency received. Each group of receivers comprises at least one and preferably a plurality of individual receivers, for example, microphones M forming in each case a so-called linear group of radiators connected in phase, that is, connected in parallel or in series. The directional characteristics of groups $G_1$ and $G_2$ are designated $R_1$ and $R_2$. In order to assure indication at higher frequencies without ambiguity, the outputs of groups $G_1$ and $G_2$ are connected to band pass filters $0_1$ and $0_2$ of a certain pass range from 400 to 800 c.p.s. This frequency level results, for example, when wind noise is not excessive and when the sound damping by air is not yet severe. The medium frequency of the pass band corresponds to the distance $d$ between $G_1$ and $G_2$, that is, the distance $d$ is made approximately half a wave length of the medium frequency of the band pass filters $0_1$ and $0_2$. Filters $0_1$ and $0_2$ are followed by phase shift circuits $P_1$ and $P_2$, which shift the phase of the output voltage of groups $G_1$ and $G_2$, one with respect to the other, by 90°. The circuits of the groups of receivers also comprise amplifiers $V_1$ and $V_2$ which may be designed as electron tube amplifiers or, for the purpose of saving energy, as transistor amplifiers or as high-frequency feedback oscillator tubes. The voltages received are passed to a phase comparison circuit SD to the output of which is connected a receiving device comprising a polarized relay PR or the like. The polarized relay responds to the vectorial sum of the voltages of the groups of receivers $G_1$ and $G_2$. Preferably, a sum and difference rectifier circuit or modulation bridge or crossed coil instrument are used as a phase comparing circuit SD. The circuit is such that the polarized relay PR will energize responsive to the rectified difference voltage. With the polarized relay PR, there is connected a main relay H, which will energize in predetermined manner responsive to actuation of the polarized relay, thereby actuating a signal which is transmitted over a line L. For this purpose, the polarized relay PR and the main relay H are connected to a capacitor C, a battery B and resistors $W_1$, $W_2$ and $W_3$. The arrangement is such that, when the polarized relay is actuated to the one side, capacitor C will be charged, the main relay for the time being remaining normal. Upon subsequent actuation of the polarized relay to the other side, capacitor C will be discharged over the winding of the main relay H, and only then will the main relay H be operatively energized and will cause the signal to be operated.

The above indicated circuit effects operation of the main relay H to transmit a signal only after the polarized relay has been actuated to the left as well as to the right. This, in turn, requires presence of the radiator first on one side of the plane E and, thereafter, on the other side thereof, that is, the radiator must have passed the plane if a signal is to be released. Interference radiations, only temporarily occurring on the one side of the plane are accordingly not recognized and will not cause release of a signal. The same applies to radiators passing the plane from the right to the left, that is, moving in the opposite direction. The charging and discharging time constant of capacitor C is controlled by the resistors $W_1$ and $W_3$ and in special cases of airplane detection should range between 0.1 and 10 seconds, depending on the conditions resulting from the directional characteristics of groups of receivers $G_1$ and $G_2$ as well as from the rate of motion of the radiator.

Figure 2:
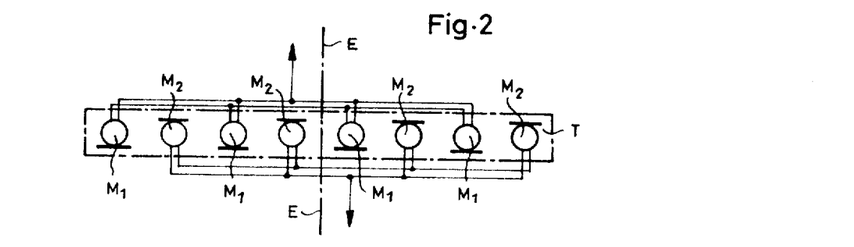
FIG. 2 shows a plurality of receivers connected in a spatially staggered row.

In accordance with the arrangement according to FIG. 2, the groups of microphones of the receivers $G_1$ and $G_2$ (FIG. 1) are mounted in a row spatially staggered, preferably on a common support T. Receivers, for example, microphones $M_1$ belong to the group $G_1$ (FIG. 1) and microphones $M_2$ belong to group $G_2$ (FIG. 1). As microphones, there may be used, for example, dynamic microphones or loudspeaker systems individually balanced with regard to sensitivity and phase.

Figure 3:
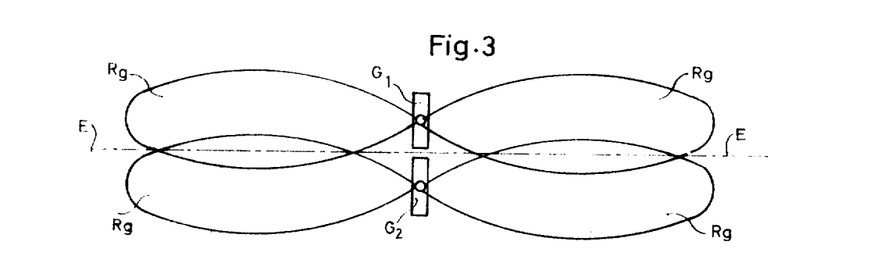
FIGS. 3 and 4 schematically indicate the arrangement of groups of receivers close to the ground.
Figure 4:
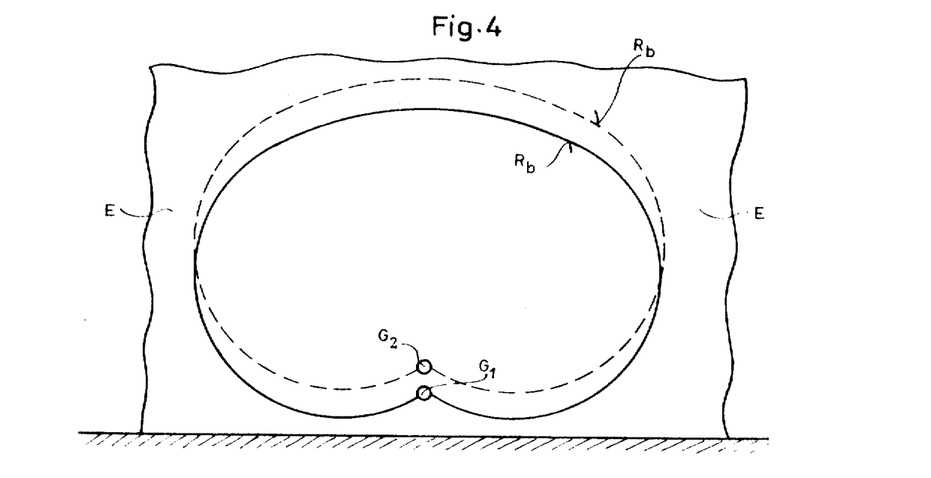

In accordance with the arrangement according to FIGS. 3 and 4, the groups of receivers $G_1$ and $G_2$ (FIG. 1) are located close to the ground, preferably also in a row and spatially staggered corresponding to FIG. 2. To simplify FIGS. 3 and 4, the groups $G_1$ and $G_2$ are shown one above the other. FIG. 3 shows a horizontal cross-section at a right angle to the transit plane E, and FIG. 4, a vertical cross-section parallel to the transit plane. Groups of receivers $G_1$ and $G_2$ are on a line perpendicular to the transit plane E and in the sectional plane at a right angle to the plane E have the focused, club-shaped bi-directional field pattern $R_g$. In the plane parallel to the transit plane E as shown in FIG. 4, they have the relatively wide kidney-shaped directional characteristic $R_b$, for example, in order to eliminate interference noise and reflections from ground, the maximum of the directional characteristics being situated at either side of the transit plane E. The microphones may also be mounted on a pole and may be provided with a wind mask made of fine mesh fabric not impeding the sound.

Figure 5:
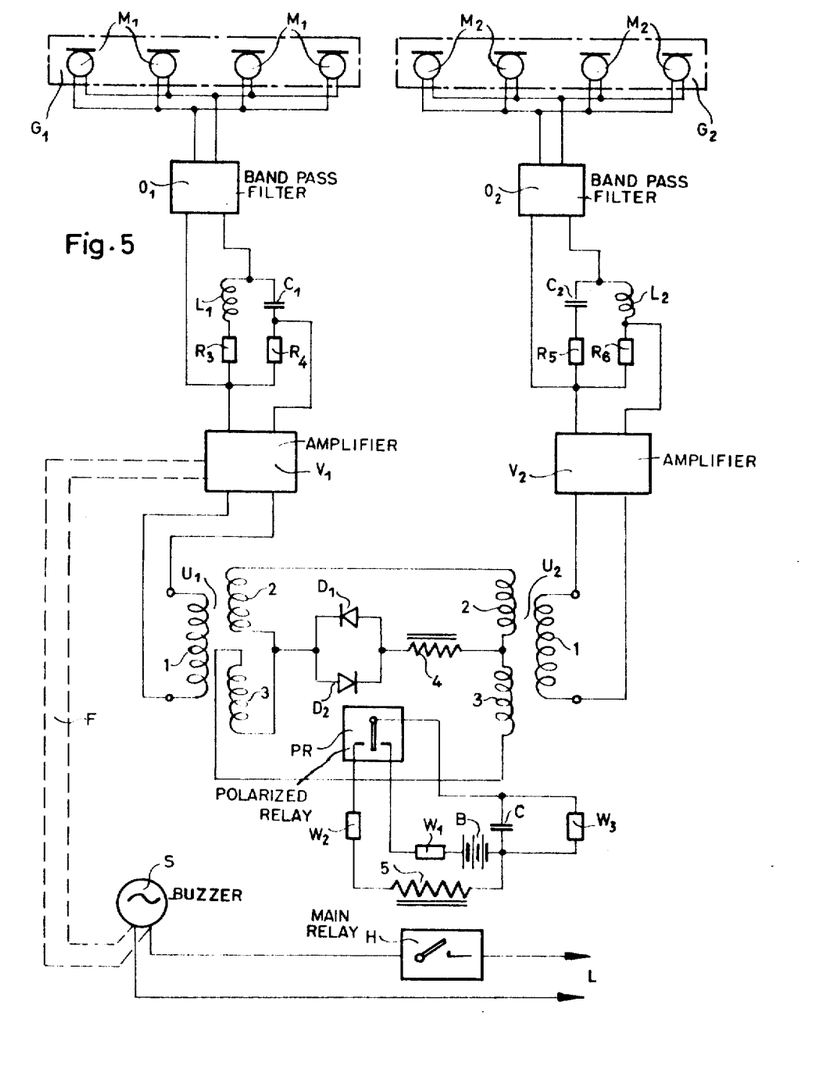
FIGS. 5, 5a and 5b illustrate circuit details of an embodiment.

In accordance with FIG. 5, each group of receivers $G_1$ and $G_2$ again comprises a number of microphones $M_1$ and $M_2$, connected in parallel or in series and in phase. They are respectively followed by octave and tertiary filters $O_1$ and $O_2$. Instead of using octave filters, the input coupling or the output transformers may be such as to transmit only a desired frequency band (resonance transformer). Next, phase shifting circuits follow, that is, resonance circuits respectively marked $L_1$, $C_1$ and $L_2$, $C_2$, respectively, connected to resistors $R_3$, $R_4$ and $R_5$, $R_6$. The output voltages at the output of the octave filters $O_1$ and $O_2$ are respectively connected to points between the coil $L_1$ and the capacitor $C_1$ and $L_2$ and $C_2$ on the one side, and on the other side, are respectively connected to points between the resistors $R_3$, $R_4$ and $R_5$, $R_6$. The phase shifted voltage is respectively tapped at the resistors $R_4$, $R_5$ and respectively fed to the amplifiers $V_1$ and $V_2$. The voltages of the two circuits of receiver groups are in this manner shifted one with respect to the other by 90°, provided that certain conditions are fulfilled, for example, $$R = \sqrt{\frac{L}{C}}$$

whereby the resonance frequency $$\omega_0 = \frac{1}{\sqrt{L \cdot C}}$$

is equal to the medium frequency of the transmission range. Instead of using phase shift circuits operating as resonance circuits, phase shift circuits in the form of known bridge networks may be used. The amplifiers $V_1$ and $V_2$ are respectively followed by the summation and difference rectifier circuit comprising two differential transformers $U_1$ and $U_2$. Each transformer has a primary winding 1 and two secondary windings 2 and 3. The secondary windings are connected in series and in opposite phase in the one case, and in phase in the other case. The center taps are connected to oppositely polarized rectifiers $D_1$ and $D_2$ and to winding 4 of a polarized relay PR. If the relay has two windings, both half waves may be used (full wave rectification). Instead of the summation and difference circuit, another phase indication, for example, by double push-pull modulators or bridge modulators or by the principle of watt meters (cross coil instrument; quotient meter) may be used, $(U_1 U_2 \cos \varphi)$ or with an instrument based on the induction principle (rotary field instrument). The sequences of the individual elements may be different in accordance with prevailing matching requirements.

Figure 5A:
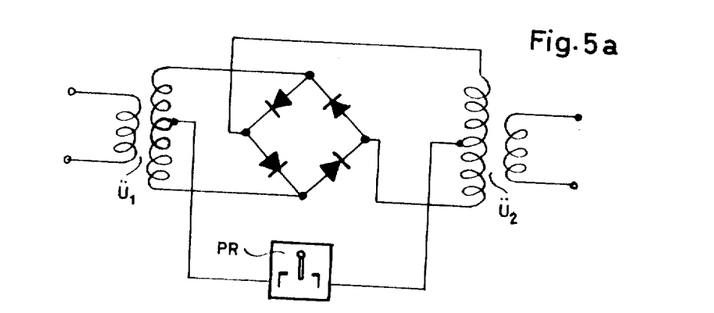
Figure 5B:
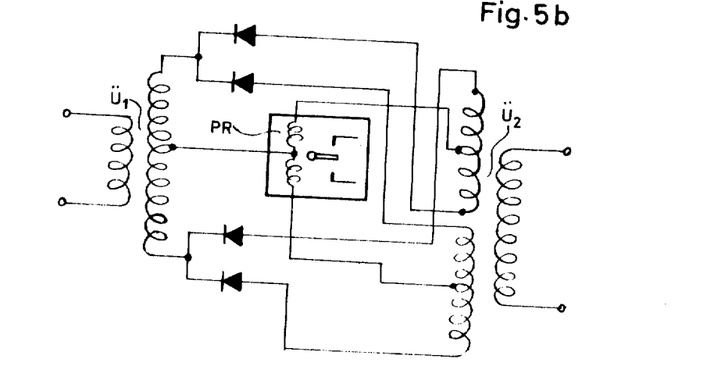

FIG. 5a shows the diagram of a bridge modulator used as a circuit to compare the phases. FIG. 5b shows the diagram of a double push-pull modulator in a circuit measuring the phase. Both circuits may replace the sum and difference circuit as per FIG. 5.

The device operates as follows:

With the receiving device in accordance with the invention, the activating element is the phase of the wave of the radiator. The microphones of the two groups $G_1$ and $G_2$ are spatially staggered by 8 inches. In case, the sound comes from the right, it will arrive at the right hand group $G_2$ slightly earlier than at the left one. If the sound comes from the left, it will arrive at the left-hand group of microphones $G_1$ slightly earlier than the right one. In case the sound travels vertically over the line between both groups, it will pass both groups of microphones simultaneously. This implies that, at a certain frequency, the phase angle will be positive, zero or negative depending on whether the sound comes from the right, crosses the line at a right angle, or comes from the left. Sum and difference of the electric voltages produced by the sound are determined by the electric circuit connected to the microphones. In case of the sound originating from the right, a phase shift of $+180°$ would have the sum zero, the difference however amounting to twice the amplitude. If the sound travels at a right angle to the line, the phase shift is zero and the sum would be the double value, but the difference would be zero. In case of the sound originating from the extreme left, corresponding to a phase of $-180°$, the sum is zero again and the difference the double value. The sum and difference circuit described, with transformers $U_1$ and $U_2$ and rectifiers $D_1$ and $D_2$ as well as the polarized relay PR will perform the evaluation. The sum and difference currents are rectified by this circuit and fed to winding 4 of relay PR such, that the relay will only be actuated by their difference. If both currents are equivalent the difference is zero and the relay will not be actuated. If the sum exceeds the difference, that is, the phase angle is zero, the polarized relay will be actuated to the right. If however, at a phase angle of 180° the difference exceeds the sum, it will be actuated to the left. In case of a phase angle of 90°, the sum would equal the difference and the relay would not be actuated. This would happen if the sound source is at an angle of about 45° to the line vertical to the plane of the microphone groups $G_1$ and $G_2$. However, it is frequently desired, that this case does not only arise after the sound source is vertical to the microphone groups $G_1$ and $G_2$. Therefore, the invention provides an artificial phase shift of 90° by electrical means. Then, a sound source on the other side, that is, to the right of the plane E will actuate the relay towards the right, and a sound source on this side, that is, to the left of the plane, will actuate it towards the left. In order to prevent a signal from being produced responsive to single actuation of the relay, main relay H will be operated over the capacitor circuit mentioned before, only after the polarized relay PR has charged the capacitor C, incident to being actuated to the right, and thereafter, with a certain time constant has discharged it over winding 5 of the main relay H incident to actuation to the left. When the main relay H is energized, its contact will connect a buzzer S or the like to line L, so that a signal is being transmitted.

The selection of charging and discharging time constants of capacitor C plays a certain role. To prevent short pulses or a reversion of the direction of sound at long intervals from releasing a signal, the charging time constants chosen are not too low and the discharging time constants not too high.

There is some relation between the length of microphone groups $G_1$ and $G_2$, and the frequency band used. Directional groups of microphones have a double advantage, namely, interference noises originating from the side are suppressed and reflections of sound or the like are rendered ineffective by the directional effect. Thus, secondary sound will not cause actuation of the device. On the one hand, the directional characteristic of the groups of microphones shall be sharply defined, on the other hand, the groups of microphones must be able to respond sufficiently to sound traveling at the angle producing actuation of the relay. The invention may also be applied to sound ranging over a wide band of frequencies. It is advisable to filter from the sound spectrum and apply to the device only a part of the frequency range. This is done by suitable rating of the band pass filters $O_1$ and $O_2$. To make the apparatus more useful, it may be employed for different ranges of frequencies, if the noise covers characteristic frequency bands.

Figure 6:
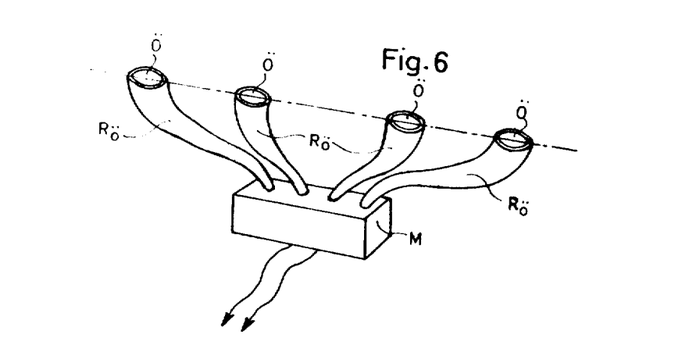
FIG. 6 shows a modified microphone group.

Instead of receiver groups comprising microphones or the like connected in parallel, a microphone group as shown in FIG. 6 may be used. Here, one microphone M only is provided, to which tubes or hoses Ro are connected, the openings O forming a straight line. The tubes or hoses are of equal length, that is, the median portion of the tubes are curved so as to secure equal propagation time therewithin. Such a group of tubes has a directional characteristic corresponding to that of a group of microphones described before.

Figures 7, 8, 9, 10, 11:
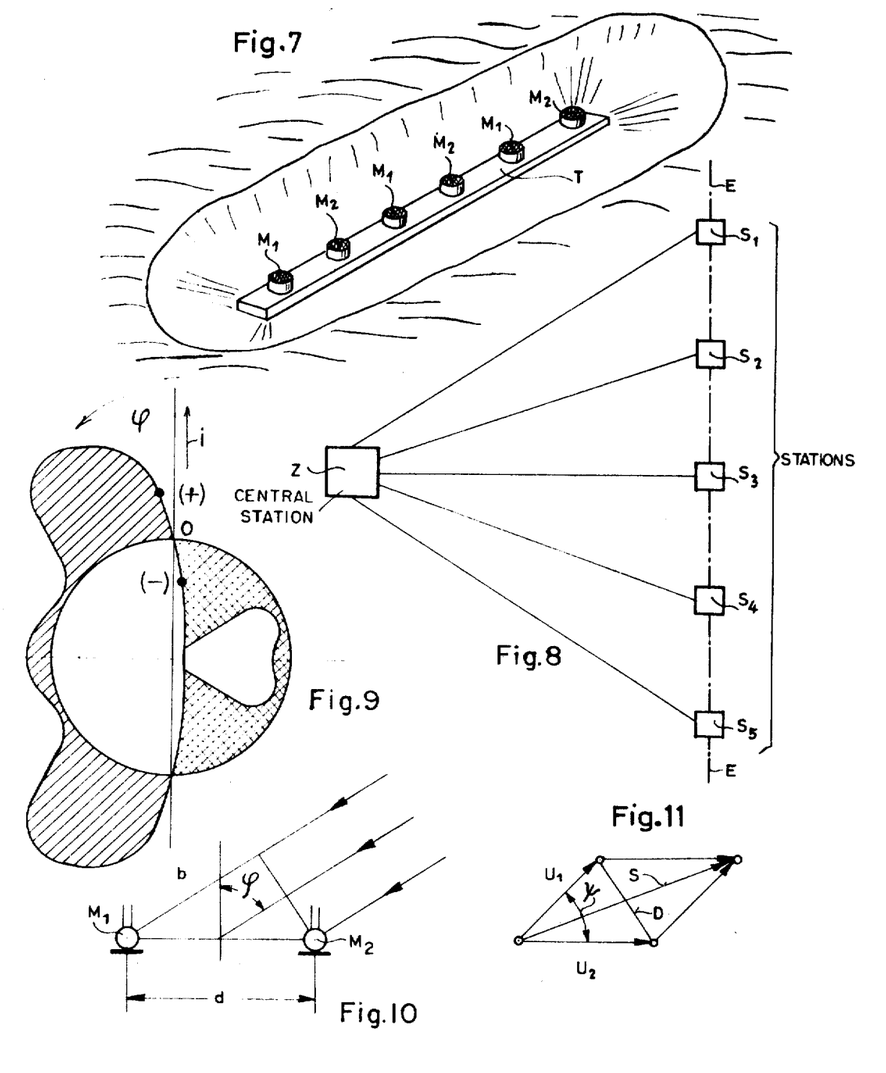
FIG. 7 indicates a group of microphones constituting receivers, buried in the ground.
FIG. 8 shows a basic diagram for disposing a plurality of stations to control a desired area.
FIGS. 9 to 11 are intended to aid in the mathematical explanations of aspects of the invention.

According to FIG. 7, the groups of microphones or other receivers may be buried in the ground and be effective vertically upwardly so that the sphere of action in space is above ground.

In place of the signal oscillator S shown in FIG. 5 may be used an amplifier such as $V_1$ or $V_2$, with means actuated by the main relay, for switching such amplifier over to operate as a tube oscillator. For this purpose, the links F shown in dash lines are connected between amplifier $V_1$ and $V_2$ and the main relay H.

With reference to FIGS. 9 to 11, the relations explained may be mathematically treated as follows:

Let $M_1$ and $M_2$ be the two groups of microphones with a distance $d$ one from the other. The solid angle between the center normal and the direction of sound incidence be $\varphi$ (see FIG. 10).

The way of the sound traveling to microphone $M_1$ will be longer by the distance $b$ than its way to microphone $M_2$. At a wave length $\lambda$, this distance corresponds to an electric angle of $$\psi' = \frac{b}{\lambda} 360 = \frac{d \sin \varphi}{\lambda} 360°$$

by which the voltages of the microphones are shifted one relative to the other.

The next successive electrical circuit will now turn the angle $\psi'$ by 90° so that $\psi = \psi' - 90°$. Moreover, there are obtained the sum and the difference of the two voltages assumed to be of equal amplitude $U_1 = U_2 = U$. The vectorial representation in FIG. 11 gives $$\sin \frac{\psi}{2} = \frac{D}{2U}$$

$$\cos \frac{\psi}{2} = \frac{S}{2U}$$

Owing to rectification, the relay current is proportional to the difference of the modulus $$|S| - |D|$$

Therefore, $$|S| - |D| = 2\left(U \cos \frac{\psi}{2} - U \sin \frac{\psi}{2}\right) = 2U\left(\cos \frac{\psi}{2} - \sin \frac{\psi}{2}\right)$$

which may be written $$|S| - |D| = 2U\left(\cos \frac{\psi}{2} - \cos \left(\frac{\psi}{2} - \frac{\pi}{2}\right)\right)$$

and which, after an elementary trigonometrical transformation is equal to:

$$|S|-|D|=-4U\left(\sin\frac{\psi-\frac{\pi}{2}}{2}\sin\frac{\pi}{4}\right)=-2\sqrt{2}U\sin\frac{\psi-\frac{\pi}{2}}{2}$$

But $\psi=\psi'+90°$,
and therefore $$\psi=\frac{d}{\lambda}\sin\varphi\ 360°+90°$$

$$|S|-|D|=-2\sqrt{2}U\sin\frac{\frac{d}{\lambda}(\sin\varphi)360°+90-90°}{2}$$

$$=2\sqrt{2}U\sin\frac{d}{\lambda}180°\sin\varphi$$

which is for $$d=\frac{\lambda}{2}$$

$$|S|-|D|=-\sqrt{2}UR\sin(90\sin\varphi)$$

if $R=f(\varphi)$ is the directional effect of the microphone line.

An evaluation of a line of 60 cm. in length is shown in FIG. 9.

Several stations are suitably arranged sequentially over a certain area in order to keep such area under control. A basic diagram of this kind is shown in FIG. 8, wherein stations $S_1$ to $S_5$ are situated at certain distances in the transit plane and arranged in consecutive order. The individual stations are connected over transmission lines or wireless communication with the central station Z where the signals are received and evaluated. Preferably, in accordance with the principles of multiplex telegraphy, the signals from station $S_1$ to $S_5$ with different frequencies or sign coding, are transmitted to the central station Z as soon as a radiator passes the plane at the station concerned.

In order to achieve a greater reliability two or more rows of detecting devices may be connected in series. It is in this manner possible to receive and to control mobile radiators with stationary stations, for example, for instrument landing on air fields.

Conversely, however, the receiving station may also be made mobile to detect stationary radiators. For this purpose, the receiving device is made rotatable, as with rotary detecting devices, or is rotated by a motor drive or driven so as to perform a periodical sweep, for example, for direction finding of fog signals aboard ships.

The invention is not restricted to sound radiators or sound receivers. It may be used equally well for high-frequency radiators and wireless transmitters and receivers or the like.

FIG. 9 shows by a polar diagram the relay current of the circuit versus the solid angle $\varphi$. The obliquely hatched sections show the positive relay current effective to actuate the relay to the left, and the crosswise hatched sections show the negative relay current effective to actuate the relay to the right.

FIGS. 12 to 15 illustrate another example of the device according to the invention. The principle of the invention is in this example realized so that a pressure receiver together with a gradient receiver are connected to a sum and difference circuit in which is obtained and separately amplified, if so required, the sum voltage of both receivers and the difference voltage thereof. The rectified difference voltage of both channels is thereupon fed to the polarized relay.

Figures 12, 13, 14, 15:
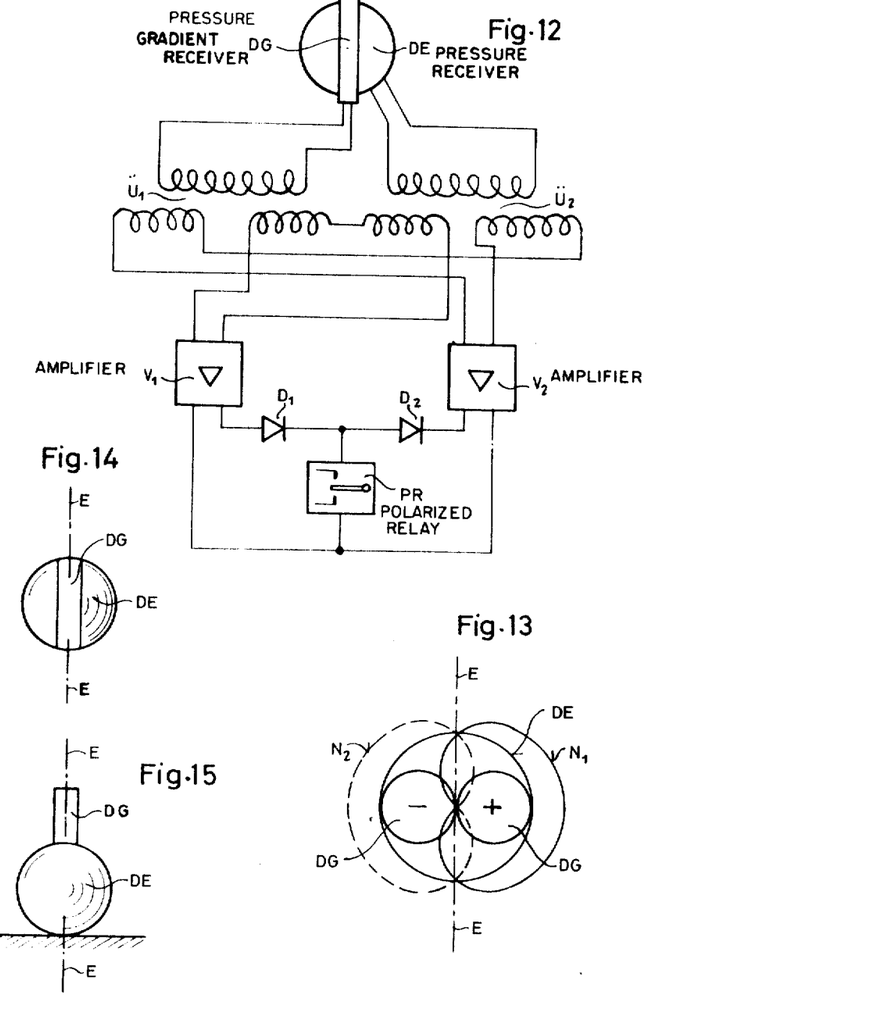
FIGS. 12 to 15 illustrate a modification.

The device according to FIG. 12 comprises the pressure gradient receiver, for example, a pressure gradient microphone DG and pressure receiver, for example, a pressure microphone DE. The output terminals of the pressure gradient receiver DG are connected to the primary winding of the differential transformer $U_1$, and the output terminals of the pressure receivers DE are connected to the primary winding of the other differential transformer $U_2$. Transformers $U_1$ and $U_2$ are provided each with two secondary windings, one of which is connected in series and in phase and coupled with amplifier $V_1$, while the other secondary windings are connected in series and in opposite phase and coupled with amplifier $V_2$.

Thus, at the amplifier $V_1$ is produced the voltage sum of the output voltages of the gradient receiver DG and the pressure receiver DE, while the difference of the voltages of the two receivers is effective at the amplifier $V_2$.

The sum and difference of the voltages at the outputs of the two amplifier channels $V_1$ and $V_2$ are obtained and fed to the polarized relay PR.

The mode of operation of the circuit will be explained with reference to the directional diagrams shown in FIG. 13.

The pressure gradient receiver has the figure-eight-shaped direction characteristic DG and the pressure receiver the spherical directional characteristic DE. With the figure-eight-shaped directional characteristic DG, the voltages at either side of the plane in the space E are of opposite phase, while with the spherical characteristic DE, voltages of constant phase result throughout. Due to the summation, the kidney-shaped directional characterstic $N_1$ results at the right hand side of plane E, while at the left hand side of plane E, the mirror image $N_2$ of the kidney-shaped characteristic results from the difference produced.

The mode of operation of the device is based on the sum and difference obtained in a purely acoustic manner. The pressure receiver is not directional and receives sound from all sides at equal phase. With the gradient receiver with a figure-eight-shaped directional characteristic, phase inversion occurs, depending on whether the sound incidence is from the front or from the rear. This is due to the sound pressure being a scalar quantity and the gradient of the sound pressure being a vector.

If the figure-eight-shaped directional characteristic is combined with the spherical characteristic, a kidney-shaped characteristic results in known manner. By exchanging the polarity of the figure-eight-shaped characteristic, a kidney directed to the right and one directed to the left may be produced. Thus, similarly to obtaining the sum and difference electrically, the relay may be actuated to the left or to the right, depending on whichever kidney-shaped characteristic produces the higher voltage.

The directional effect may be improved, if, in accordance with the invention, the pressure receiver DE is represented by a group of several pressure receivers connected in phase and operating like linear groups of radiators, and if the gradient receiver is represented by a corresponding group of several gradient receivers connected in phase. Sharply focused directional characteristics similar to those shown in FIG. 3 are thus obtained.

It is feasible to use in place of the pressure receiver combined with a gradient receiver two separate microphones with a kidney-shaped characteristic. This, however, may result in drawbacks if the one microphone with the kidney-shaped characteristic becomes less sensitive than the other microphone with the kidney-shaped characteristic leading in this manner to faulty direction finding.

The fact that the production of sum and difference, otherwise done electrically, as well as the 90° shifting, is accomplished acoustically, may be shown by the following calculation:

The input voltages at the amplifiers are:

$$S=p+\text{grad } p \text{ and } D=p-\text{grad } p$$

The potential of plane wave is:

$$\Phi=Ae^{j(\omega t-kx)}$$

$$p=\rho\frac{\delta\phi}{\delta t}=j\omega Ae^{(j\omega t-kx)}$$

$$\text{grad } p = \frac{\delta p}{\delta x} = -j^2 \omega Q k e^{j(\omega t - kx)}$$

or grad $p = -jkp$, that is, owing to the multiplication by $j$, gradient $p$ and sound pressure are shifted by 90° relative to time.

The advantages of this procedure are that it will be clearly valid for all frequencies; its disadvantages that the gradient microphone will respond to sound softer, thus being more sensitive to wind, further, that spatial phase shifts between pressure and gradient may occur within a standing wave.

The following explanations will demonstrate the difference in principle between the device shown in FIG. 5 and the device shown in FIG. 12.

Within the traveling wave, there is a displacement of 90° with respect to time, between sound pressure and the gradient of the sound pressure, since $$\text{grad } p = -jkp$$

Within the standing wave, however, there is a spatial displacement by $$90° \left(= \frac{\lambda}{4}\right)$$

between sound pressure and gradient of the sound pressure, since $$p = j\omega 2Q e^{j\omega t} \cos kx$$

and since $$\text{grad } p = j\omega 2Q k e^{j\omega t} \sin kx$$

$Q$ = yield factor, and $$k = \frac{2\pi}{\lambda} = \frac{\omega}{c} \text{ circular wave figure}$$

For example, near to ground ($x=0$), $p$ is a maximum and grad $p=0$. Consequently, there would only be a spherical directional effect, that is, the procedure would not work.

With the first procedures based on the sound pressure, both channels only react to the sound pressure, so that it would also operate on the ground.

Since, however, a purely standing wave rarely occurs, the device can function in practice, particularly, if the receivers are installed at equal height above ground, and the sound is not a pure sine wave.

FIGS. 14 and 15 show in horizontal section and front elevation respectively the mode of assembly of the pressure gradient receiver DG and the pressure receiver DE. Both receivers or microphones, respectively, are preferably arranged one above the other, that is along the same vertical axis.

What is believed to be new and desired to have protected by Letters Patent is defined in the appended claims.

I claim:

1. A device for indicating the presence of and the direction of motion of a sound producing object passing through air space, comprising directional detector means for receiving sound and producing alternating control voltages corresponding thereto, means for creating a phase shift of 90° between said voltages, phase comparison means, means for conducting said voltages to said phase comparison means, a polarized element operatively connected to said phase comparison means, said polarized element being operatively responsive to current from said phase comparison means depending upon alternating voltages produced by said detector means responsive to sound from an object moving in a predetermined direction through said space, a signalling device responsive to predetermined sequence of operation of said polarized element for producing a signal to indicate the passage of said object, and control means operatively interconnecting said signalling device and said polarized element and including a time constant circuit operatively responsive to the actuation of said polarized element in accordance with the time interval between a first and a second sound received from said object upon passing through said space within a predetermined range of speed, whereby actuation of said signalling device is suppressed by the operation of said control means responsive to detection of objects moving through said space at speeds outside of said predetermined range of speed.

2. The apparatus as defined in claim 1, wherein said detector means has a directional characteristic which is sharply focused in one sectional plane of said space and wide in the sectional plane vertical thereto.

3. Apparatus as defined in claim 1, wherein said detector means has a directional characteristic which is sharply focused in one sectional plane of said space and wide in the sectional plane vertical thereto, said detector means being arranged on either side of the plane of said space, with the sectional plane having the wide directional characteristic disposed in parallel on either side of the plane of said space.

4. Apparatus as defined in claim 1, wherein said detector means comprises a plurality of staggered detectors connected in phase and constituting linear detecting groups.

5. Apparatus as defined in claim 1, wherein said detector means comprises a plurality of detector means arranged in a straight line disposed vertical to the plane of said space.

6. Apparatus as defined in claim 1, comprising a polarized relay constituting said polarized element, a non-polarized relay constituting said signaling device connected with said polarized relay, said control means operative to actuate said nonpolarized relay only in response to actuation of said polarized relay successively in a first and thereafter second direction.

7. Apparatus as defined in claim 1, wherein said control means comprises a capacitor, a charging circuit for said capacitor extending to said polarized element, a discharging circuit for said capacitor extending to said signaling device and from said signalling device to said polarized element, said capacitor being charged in said charging circuit responsive to actuation of said polarized element in one direction and being discharged in said discharging circuit over said signaling means to said polarized element responsive to actuation of said polarized element in the other direction, thereby energizing said signaling device.

8. Apparatus as defined in claim 1, wherein said control means comprises a capacitor and a charging and discharging circuit therefor connected respectively with said polarized element and said signaling device, said capacitor being charged responsive to actuation of said polarized element in one direction and discharged over said signaling means responsive to actuation of said polarized element in the other direction, thereby energizing said signaling device, the time constant of said charging and discharging circuit corresponding to the directional characteristic of said detector means as governed by a predetermined rate of motion of said object passing said space and being on the order of 0.1 to 10 seconds.

9. Apparatus according to claim 1, wherein said phase comparison means embodies a sum and difference rectifier circuit including a first and a second transformer, each transformer having one primary winding and two secondary windings, the secondary windings of the first transformer being connected in series and the secondary windings of the second transformer being connected in series opposition and interconnected with the secondary windings of the first transformer, the centers of said secondary windings being connected with two oppositely poled rectifiers extending in series with a winding of a polarized relay constituting said polarized element.

10. The apparatus as defined in claim 1, comprising a bridge modulator circuit constituting said phase comparison means.

11. Apparatus as defined in claim 1, comprising a two-coil watt meter system constituting said phase comparison means.

12. Apparatus as defined in claim 1, wherein said detector means is arranged in two groups, band pass filters in the circuit of each detector group, the pass band of said filters ranging from 400 to 800 c.p.s., whereby the distance between said groups is approximately equal to half a wave length of the median frequency passed by the filters.

13. Apparatus as defined in claim 1, wherein said detector means comprises two channels each including detector means and an amplitude limiting device.

14. Apparatus as defined in claim 1, wherein said detector means comprises two channels each including detector means and amplifier means.

15. Apparatus as defined in claim 1, wherein said detector means comprises two channels each including detector means and resonance circuit means for shifting the phases of the voltages produced by said detector means.

16. Apparatus according to claim 1, in combination with a signal generator, and means actuated by said signaling device for switching in said generator.

17. Apparatus as defined in claim 1, comprising an amplifier disposed in the circuit of said detector means, and means controlled by said signaling device for changing the operation of said amplifier to a signal generator.

18. Apparatus as defined in claim 1, wherein said detector means comprises a microphone connected with a plurality of tubes having openings extending in a straight line.

19. Apparatus as defined in claim 1, wherein said detector means comprises two sets of detectors each including a pressure detector and a gradient detector, a sum and different circuit connected with said detectors for producing the sum of the voltages and the difference of the voltages of both sets of detectors, and means for feeding the rectified difference voltage of both detector sets to said polarized element.

20. Apparatus as defined in claim 1, wherein said detector means comprises a group of several pressure receivers connected in phase, and a group of several gradient receivers connected in phase.

References Cited
UNITED STATES PATENTS

| | | | |
|---|---|---|---|
| 2,301,744 | 11/1942 | Olson | 340—16 X |
| 2,304,965 | 12/1942 | Sproule | 340—16 |
| 2,434,644 | 1/1948 | Fairweather | 340—16 |
| 2,535,134 | 12/1950 | Howard et al. | 340—16 |
| 2,702,379 | 2/1955 | Barton | 340—6 |

RODNEY D. BENNETT, *Primary Examiner.*

NORMAN A. EVANS, CHESTER L. JUSTUS, FREDERICK M. STRADER, RICHARD A. FARLEY,
*Examiners.*

P. H. BLAUSTEIN, D. G. BREKKE, R. A. KUYPERS,
*Assistant Examiners.*